US008671503B2

(12) United States Patent
Tuman

(10) Patent No.: US 8,671,503 B2
(45) Date of Patent: Mar. 18, 2014

(54) CLEANING SPONGE

(75) Inventor: Scott J. Tuman, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 430 days.

(21) Appl. No.: 12/421,753

(22) Filed: Apr. 10, 2009

(65) Prior Publication Data

US 2010/0257685 A1 Oct. 14, 2010

(51) Int. Cl.
*A47L 13/16* (2006.01)

(52) U.S. Cl.
USPC .......... 15/244.4; 15/118; 15/244.1; 15/209.1; 15/244.3

(58) Field of Classification Search
USPC .......... 15/244.4
IPC .......... A47L 13/16
See application file for complete search history.

(56) References Cited

U.S. PATENT DOCUMENTS 2,268,403 A 12/1941 Kingman
2,596,565 A 5/1952 Kautenberg
2,804,728 A * 9/1957 Politzer et al. ................ 451/532
2,916,930 A 12/1959 Gregory
3,256,075 A 6/1966 Kirk et al.
3,392,421 A 7/1968 Mathison
3,634,901 A 1/1972 Landsberg
3,641,610 A 2/1972 Lewis, Jr.
4,130,683 A * 12/1978 Michel et al. ................ 428/194
4,232,128 A * 11/1980 Michel et al. ................ 521/134
6,723,539 B1 4/2004 Angus et al.
6,774,152 B2 * 8/2004 Shaw et al. ................ 521/99
2005/0266229 A1 * 12/2005 Porticos et al. ............ 428/317.9
2008/0016641 A1 * 1/2008 Armaly ................ 15/244.4

FOREIGN PATENT DOCUMENTS

DE 2115237 10/1972
DE 19501201 * 7/1996 ............. A47L 13/16
DE 102006005984 8/2007
EP 0938862 9/1999
FR 1133161 3/1957
GB 1390240 4/1975
WO WO 01/28741 4/2001
WO WO 2007/090570 8/2007
WO WO 2007090570 A1 * 8/2007 ............. A47L 13/16

* cited by examiner

*Primary Examiner* — Monica Carter
*Assistant Examiner* — Stephanie Berry
(74) *Attorney, Agent, or Firm* — Trisha D. Adamson

(57) ABSTRACT

A cleaning sponge with embedded clusters for providing enhanced scouring is disclosed. In one embodiment, the cleaning sponge comprises a sponge body and a plurality of discrete fiber clusters embedded within the sponge body. Each fiber cluster is a matrix of interconnected fibers. In one embodiment, each fiber cluster is a three dimensional web of entangled fibers bonded to one another at their mutual contact points.

20 Claims, 2 Drawing Sheets

100
112
110
114
120

CLEANING SPONGE

BACKGROUND

The present disclosure relates to a cleaning sponge. In particular, the present disclosure relates to a cleaning sponge with embedded fiber clusters for enhanced scouring of the cleaning sponge.

Sponges work well for cleaning. Sponges can hold and deliver moisture to a surface needing cleaning, while the sponge also provides an effective surface for wiping. In addition, sponges are typically able to absorb liquid. However, a sponge alone is generally too compressible to effectively scour a heavily soiled surface. A scouring web, which is typically a low density nonwoven web of fibers, may be secured to a surface of the sponge to aid in cleaning heavily soiled surface. These types of scouring webs are highly effective for scrubbing and cleaning heavily soiled surfaces. However, food, dirt, or other debris can become trapped within the web of fibers. Also, one side of the sponge is used for wiping while the other side of the sponge is used for scouring. This requires changing between surfaces to facilitate the particular cleaning activity.

SUMMARY

Embedding fiber clusters within the body of a cleaning sponge provides enhanced scouring to the sponge. Embedding the fiber clusters into the body of the cleaning sponge greatly limits the amount of food, dirt, and other debris that might otherwise become entangled within the fiber clusters because the material of the sponge penetrates into the openings in the fiber cluster. The cleaning sponge has a cleaning surface with both sponge and embedded fiber clusters so that wiping and scouring can take place with one surface of the sponge.

In one embodiment, the cleaning sponge comprises a sponge body and a plurality of discrete fiber clusters embedded within the sponge body. Each fiber cluster is a matrix of interconnected fibers. In one embodiment, the fiber clusters are compressible but require a higher force to compress than the foam body. In one embodiment, the fiber clusters are randomly entangled fibers bonded to one another at their mutual contact points. In one embodiment, the fiber clusters are oriented by weaving or knitting. In one embodiment, each fiber cluster is smaller than any dimension of the sponge body. In one embodiment, each fibers cluster is less than 5% of the total volume of the sponge body. In one embodiment, the plurality of fiber clusters comprises less than 75% of the total volume of the sponge body. In one embodiment, the fiber clusters are distributed throughout the sponge body. In one embodiment, the fiber clusters are preferentially aligned to one side of the sponge body.

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention.

The figures may not be drawn to scale.

DETAILED DESCRIPTION

Figure 1:
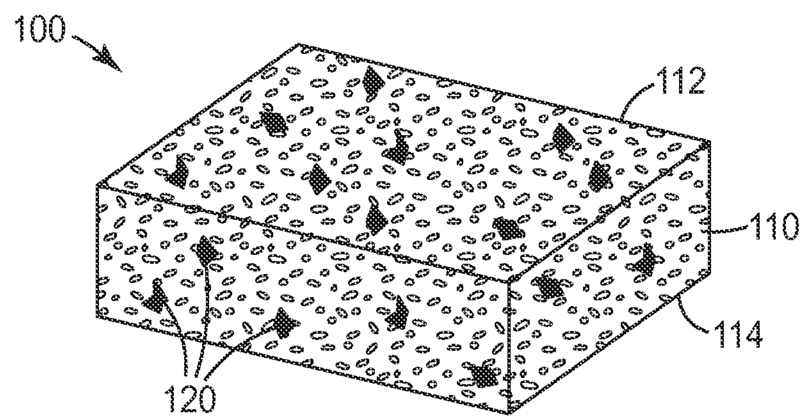
FIG. 1 is a perspective view of an embodiment of a cleaning sponge.

FIG. 1 is a perspective view of an embodiment of a cleaning sponge 100. The cleaning sponge 100 includes a sponge body 110 and a plurality of fiber clusters 120 embedded within the sponge body 110. In the embodiment shown in FIG. 1, the fiber clusters 120 are generally distributed throughout the entire sponge body 110.

The cleaning sponge 100 shown is rectangular with planar surfaces, but a variety of other shapes and sizes may be used. The cleaning sponge 100 includes a first surface 112 and second surface 114, opposite the first surface 112. As shown, the first surface 112 and second surface 114 are generally planar and are typically the surfaces used for wiping and cleaning. The sponge body 110 may include recessed grooves along side surface to aid in holding the cleaning sponge 100, such as shown in U.S. patent application Ser. No. 12/116,427, filed on May 7, 2008, titled a "Cleaning Sponge."

The sponge body 110 is porous and conformable. The sponge body 110 may be a synthetic sponge or a cellulose sponge. Synthetic foams are particularly well suited for the body because the foam is a flexible, compliant material that can absorb liquid. The synthetic foam could be an open cell foam or a closed cell foam. Synthetic foams, particularly open cell synthetic foams, are less hydrophilic and have a low ability to retain liquid within the structure as compared to cellulose sponge. Therefore, although fluid is easily absorbed in the material, the fluid is also easily flushed from the less hydrophilic foam. It is believed that the fast flushing through the pores of the less hydrophilic foam causes soap to become very sudsy as it passes in and out of the foam. Further, because the less hydrophilic foam does not readily retain liquid within the structure, the body 110 will dry faster than a more hydrophilic material such as cellulose sponge.

Exemplary materials for the sponge body 110 include all types of synthetic sponge which can be constructed of porous rubber, synthetic foam, other plastic and rubber derivatives, and the like. For example, synthetic sponge may be made from rubber, polyether, polyester, melamine, neoprene, SBR, butadiene, nitrile, EPDM, ECH, polystyrene, polyethylene, polypropylene, polyurethane, EVA, EMA, metallocene resin, PVC, or blends of any of the above, and the like.

Cellulose-based sponges can be used for the sponge body 110. Cellulose-based sponges can include those which are derived from plant products for example. Cellulose sponge provides a particularly unique wiping surface because cellulose sponge is a hydrophilic sponge that is capable of absorbing and retaining fluids. Therefore, when a damp cellulose sponge is wiped over a surface, large amounts of liquid are not deposited onto the surface being wiped. Further, spills of liquids can be absorbed and retained in the cellulose sponge until the cellulose sponge is squeezed.

Within the sponge body 110 is a plurality of discrete fiber clusters 120. Each fiber cluster 120 comprises a plurality of interconnected fibers 124. The fibers are interconnected independent of being embedded within the sponge body 110. Each fiber cluster 120 has openings between adjacent fibers of the fiber cluster 120. These openings allow the material of the sponge body 110 to penetrate within the fiber cluster 120 to securely anchor the fiber clusters 120 to the sponge body 110 and limit the amount of food or other debris from becoming engaged within the fiber cluster 120.

The fiber clusters 120 are compressible but require a higher force to compress than the sponge body 110, thereby maintaining efficacy for scouring. Therefore, even though the sponge body 110 is compressible against the surface being cleaning, the fiber clusters 120 can provide resistance to the compressible sponge body 110 against the surface being cleaned.

In comparison to the size of the sponge body 110 each fiber cluster 120 is relatively small. In one embodiment, each fiber clusters 120 is smaller in size than any one dimension (length, width or height) of the sponge body 110. Therefore, the fiber clusters 120, being small relative to the sponge body 110 and not being otherwise connected to one another, minimally impact the conformability and flexibility of the sponge body 110.

In one embodiment, each fiber cluster is less than 10% of the volume of sponge body 110. In another embodiment, each fiber cluster is less than 5% of the volume of the sponge body 110. In one embodiment, each fiber cluster 120 is less than 8 cm in its largest dimension. In another embodiment, each fiber cluster 120 is less than 4 cm in its largest dimension. In another embodiment, each fiber cluster 120 is less than 2 cm in its largest dimension.

Collectively the fiber clusters 120 comprise only a portion of the sponge body 110. The sponge body 110 forms a fully interconnected matrix surrounding the fiber clusters 120, which results in the sponge body 110 maintaining structural strength. It is believed that having a very high loading, i.e., greater than 95% of the total volume of the sponge body 110 comprised of fiber clusters 120, will negatively impact the structural integrity of the cleaning sponge 100 because the sponge body 100 cannot form as solid of a surrounding matrix. In one embodiment, collectively the fiber clusters 120 comprise less than 75% of the total volume of the sponge body 110. In one embodiment, collectively the fiber clusters 120 comprise less than 30% of the total volume of the sponge body 110. In one embodiment, collectively the fiber clusters 120 comprise less than 10% of the total volume of the sponge body 110.

There are a variety of ways that the fibers 124 can be interconnected to form the fiber clusters 120. In one embodiment, the fibers 124 are randomly entangled, which is commonly referred to as a nonwoven web. The web can be heat bonded, adhesive bonded, needletacked, hydroentangled, or have other known treatments to form the interconnected fibers 124 that make up the fiber cluster 120. In one embodiment, low density nonwoven webs of fibers provide a particularly suitable fiber cluster because of the large openings for the material of the sponge body to penetrate. In one embodiment, low density webs of fibers that have been coated with adhesive to make the web stiff and rigid provide a particularly suitable fiber cluster to aid in scouring. In one embodiment, the low density web of fibers has a density less than 50 kg/$m^3$.

The fibers 124 can be interconnected and have a specific orientation. For example, weaving or knitting fibers forms interconnected fibers. Woven or knitted fibers could also include adhesive coatings or heat bonding to increase the strength of the matrix.

Regardless of whether the fibers 124 are randomly entangled or oriented, the fibers 124 of the fiber clusters 124 may be made from natural, synthetic, or a combination of natural and synthetic fibers. Further, additives may be secured to the fiber clusters 120 such as abrasives, detergents, or microcapsules containing perfumes or soap. An example of a material suitable as a fiber cluster with perfume microcapsules is disclosed in U.S. Pat. No. 7,015,156.

Figure 2:
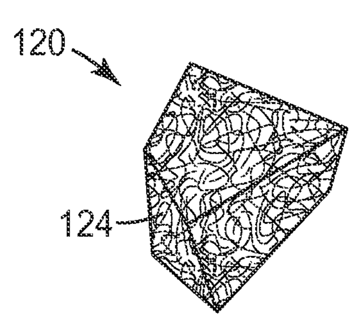
FIG. 2 is a perspective view of an embodiment of a fiber cluster.
Figure 3:
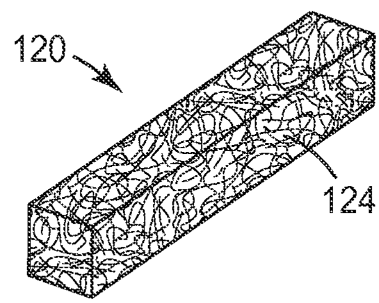
FIG. 3 is a perspective view of another embodiment of a fiber cluster.
Figure 4:
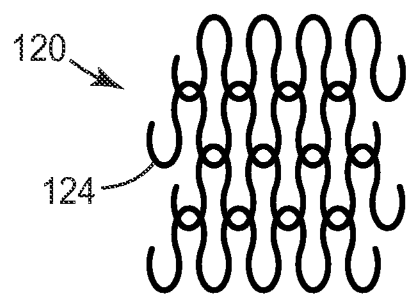
FIG. 4 is a perspective view of another embodiment of a fiber cluster.

FIGS. 2-4 show various embodiments of fiber clusters 120. Typically, the fibers clusters 120 are formed by cutting a larger fiber array into the smaller clusters 120. The fiber clusters 120 are a three dimensional body. Typically, the fiber clusters 120 are in the shape of a polygon. However, other three dimensional body shapes, irregular, or random shapes may be used. It is understood that the fiber clusters 120 can have similar or different shapes and sizes from each other within the same sponge body 110. It is understood that a variety of material can make up the fibers clusters 120 used in any single sponge body 110. For example, both nonwoven and knitted fiber clusters could be used within the same sponge body 110.

FIG. 2 shows a fiber cluster 120 that comprises a plurality of randomly arranged cut fibers that are bonded to one another with a bonding agent to form a low density nonwoven web. U.S. Pat. No. 2,958,593 to Hoover et al., the disclosure of which is herein incorporated by reference, discloses a low density nonwoven material and method of making the nonwoven material that could form a fiber cluster 120. Examples of suitable nonwoven materials are Scotch-Brite™ Heavy Duty, Multi-Purpose, and Light Duty Scouring Pads, available from 3M Company of St. Paul Minn. In another embodiment, natural fibers and/or metal fibers may be included in the nonwoven web. An example of a metal fiber web is disclosed in US patent application publication 2007/0079462. An example of a natural fiber web is disclosed in US patent application publication 2007/0026754. In the embodiment shown in FIG. 2, secured to the bonding agent is a plurality of abrasive particles. The abrasive particles can aid in scouring. In the embodiment, the fiber cluster 120 is a polygon without equal sides.

FIG. 3 shows a fiber cluster 120 that comprises a plurality of randomly arranged cut fibers that are bonded to one another with a bonding agent to form an low density nonwoven web. In the embodiment, the fiber cluster 120 is a polygon that is generally rectangular with a length greater than both the width and height. Therefore, this fiber cluster 120 takes the form of a strip.

FIG. 4 shows a fiber cluster 120 that comprises knitted fibers formed from a variety of interconnected loops. The knitted fibers could be knitted into the three dimensional body such as shown. Alternatively, knitted fibers in single layers may be used. In this embodiment, the fiber cluster 120 is a polygon that is generally cube shaped. Examples of oriented fibers that may be used as the fiber clusters are disclosed in PCT publications 2006/115982 titled "Wiping Member and Washing Articles" and 2007/067413 titled "Wiping Material."

Figure 5:
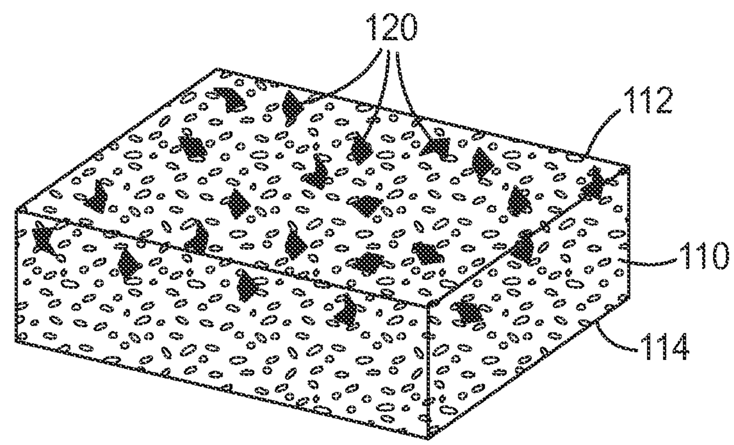
FIG. 5 is a perspective view of a second embodiment of a cleaning sponge.

FIG. 5 is a perspective view of a cleaning sponge 100 with a sponge body 110 and a plurality of fiber clusters 120 embedded within the sponge body 110. In this embodiment the fiber clusters 120 are preferentially arranged towards the top surface 112 of the sponge body 110. This creates a top surface 112 with more abrasiveness and scouring ability then the bottom surface 114 that could be used for cleaning where scouring is not needed.

In another embodiment, the fiber clusters 120 could be in close proximity to the top surface 112 and extend into the mid-section of the sponge body 110. In another embodiment, the fiber clusters 120 may be in a higher density at the top surface 112 and decrease in density toward the bottom surface. In other words, the fiber clusters 120 may be in a gradient across the thickness of the sponge body 110.

Figure 6:
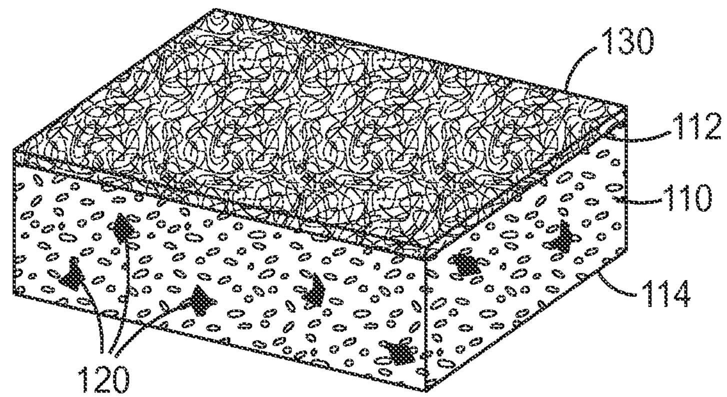
FIG. 6 is a perspective view of a third embodiment of a cleaning sponge.

FIG. 6 shows a cleaning sponge 100 substantially as described in FIG. 1 with a cleaning layer 130 attached to the top surface 112 of the cleaning sponge 100. The cleaning layer 130 can be a variety of different materials that provide a desirable cleaning action. For scouring, suitable materials include woven, knitted, nonwoven or foam materials. For woven materials, the looping of the weave may be angled in such a way to provide a scouring ability. For example, PCT publication 2007/067413 discloses a flat yarn with an angled loop for scouring. The foam material secured to the cleaning sponge 100 may be any of the foam materials described above, which may or may not include embedded fiber clusters. In another embodiment, for wiping, a microreplicated film may be used. Microreplicated film is particularly effective in gathering and entangling fibrous material such as lint and hair. The cleaning layer 130 may be a film or fabric printed with a cured resin that provides scouring. The cleaning layer 130 may be a surface of flocked fibers.

The cleaning layer 130 is secured to the top surface 112 of the body 110. A variety of attachment mechanisms may be used. One attachment mechanism is by laminating to the body 110 by adhesive bonding. The adhesive may cover some or the entire surface of the top surface. Depending on the materials chosen for the body 110 and the cleaning layer 130 needletacking, stitching, melt bonding, ultrasonic welding, or a removable attachment like hook/hook or hook/loop may be used for attachment. If the cleaning layer is an open fiber network, like a nonwoven, knitted, or woven material, then the cleaning layer could be introduced to the surface of the sponge body prior to full formation of the sponge. Therefore, the material of the sponge will partially penetrate into the cleaning layer to secure it to the sponge body. The attachment mechanism chosen should provide suitable durability for the intended function of the sponge 100.

The fiber clusters 120 can be individually formed or can be cut from a larger array of interconnected fibers. Once the fiber clusters 120 are formed, the fiber clusters 120 are introduced to the material that forms the sponge during the sponge forming process. Therefore, the fiber clusters 120 will be embedded in the sponge once the sponge is fully formed. The interconnected network of fibers 124 that makes up the fiber clusters 120 has openings between adjacent fibers. These openings allow for the material used to make the foam to penetrate within the fiber clusters 120 to secure the fiber clusters 120 within the sponge body 110 when the sponge body 110 is fully formed. Therefore, inclusion of the fiber clusters 120 within the sponge body 110 does not greatly impact the structural integrity of the cleaning sponge 100.

Synthetic sponge can be made in a batch process by adding to the polymer a material often referred to as a blowing agent. The fiber clusters 120 could be included into the reaction mixture prior to or during introduction of the blowing agent. Typically this mixture is under constant agitation, which would help mix the fiber clusters throughout. Then, a catalyst is added that very quickly initiates the formation of the foam. Introduction of the fiber clusters to the mixture just before introduction of the catalyst could result in preferentially located fiber clusters within the foam.

Cellulose sponge is traditionally made by first preparing a mixture of viscose mixed with a reinforcing fiber, like cotton. Dispersed in the viscose solution is a solid pore forming material, like Glauber's salt. The mixture is treated to coagulate and regenerate and the pore forming material is evacuated leaving a porous sponge body. The fiber clusters 120 can be introduced to the viscose solution prior to regeneration and evacuation of the pore forming material. To achieve a generally even distribution of fiber clusters in the sponge body, like shown in FIG. 1, the fiber clusters are mixed in with the viscose. To achieve a sponge body with fiber clusters preferentially adjacent to one surface, like shown in FIG. 5, the fiber clusters could be introduced late in the regeneration process, which prevents the fiber clusters from penetrating the entire depth of the viscose because of the very high viscosity of the viscose.

A user can easily hold the cleaning sponge 100 by hand or the cleaning sponge 100 may be attached to a cleaning tool, such as a dishwand or a floor mop. The user can apply light force to the cleaning sponge 100 to wipe a surface. In addition, the user can apply more force to the cleaning sponge 100 to allow the embedded fiber clusters 120 to abrade and scour against the dirt and debris contained on the surface being cleaned.

Although specific embodiments of this invention have been shown and described herein, it is understood that these embodiments are merely illustrative of the many possible specific arrangements that can be devised in application of the principles of the invention. Numerous and varied other arrangements can be devised in accordance with these principles by those of ordinary skill in the art without departing from the spirit and scope of the invention. Thus, the scope of the present invention should not be limited to the structures described in this application, but only by the structures described by the language of the claims and the equivalents of those structures.

What is claimed is:

1. A cleaning sponge comprising:

a sponge body; and a plurality of discrete fiber clusters embedded within the sponge body such that the sponge body penetrates into the fiber clusters each fiber cluster comprising:

a plurality of interconnected fibers connected to one another at mutual contact points; and openings between adjacent fibers such that material of the sponge body penetrates the openings to securely anchor adjacent fibers to the sponge body, thereby securing the fiber cluster to the sponge body;

wherein the fibers of each cluster being interconnected to one another independent of the sponge body and independent of the fibers of a remainder of the fiber clusters.

2. The cleaning sponge of claim 1, wherein the sponge body is a synthetic sponge.

3. The cleaning sponge of claim 1, wherein the sponge is a cellulose sponge.

4. The cleaning sponge of claim 1, wherein the fiber clusters are compressible.

5. The cleaning sponge of claim 1, wherein the fiber clusters require a higher force to compress than the foam body.

6. The cleaning sponge of claim 1, wherein the fibers of the fiber clusters are randomly entangled fibers bonded to one another at their mutual contact points.

7. The cleaning sponge of claim 1, wherein the fibers of the fiber clusters are oriented by weaving or knitting.

8. The cleaning sponge of claim 1, wherein at least a portion of the fiber cluster are polygons.

9. The cleaning sponge of claim 8, wherein at least a portion of the fiber clusters are rectangles having a length at least twice that of the width and height.

10. The cleaning sponge of claim 1, further comprising abrasive particles bonded to the fiber clusters.

11. The cleaning sponge of claim 1, wherein the fibers of the fiber clusters comprise synthetic, natural, or a combination of synthetic and natural fibers.

12. The cleaning sponge of claim 1, wherein each fiber cluster is smaller than any dimension of the sponge body.

13. The cleaning sponge of claim 1, wherein each fibers cluster is less than 5% of the total volume of the sponge body.

14. The cleaning sponge of claim 1, wherein the plurality of fiber clusters comprise less than 75% of the total volume of the sponge body.

15. The cleaning sponge of claim 1, wherein the fiber clusters are distributed throughout the sponge body.

16. The cleaning sponge of claim 1, wherein the fiber clusters are aligned to one side of the sponge body.

17. The cleaning sponge of claim 1, further comprising a cleaning layer bonded to a surface of the sponge body.

18. The cleaning sponge of claim 1, wherein the plurality of fiber clusters are distributed throughout a thickness of the sponge body in a gradient density.

19. The cleaning sponge of claim 1, wherein the sponge body fully surrounds the fiber clusters.

20. The cleaning sponge of claim 1, wherein the fibers within each of the plurality of discrete fiber clusters are interconnected to one another by one of heat bonding, adhesive bonding, needle tacking, and hydroentanglement.

* * * * *